Aug. 14, 1923.

A. E. HENDRICKS

CHURN

Filed July 22, 1921

1,464,873

3 Sheets-Sheet 1

Aug. 14, 1923.

A. E. HENDRICKS

CHURN

Filed July 22, 1921

1,464,873

3 Sheets-Sheet 2

A. E. Hendricks INVENTOR

BY

ATTORNEY

WITNESSES

Aug. 14, 1923.
A. E. HENDRICKS
CHURN
Filed July 22, 1921
1,464,873
3 Sheets-Sheet 3
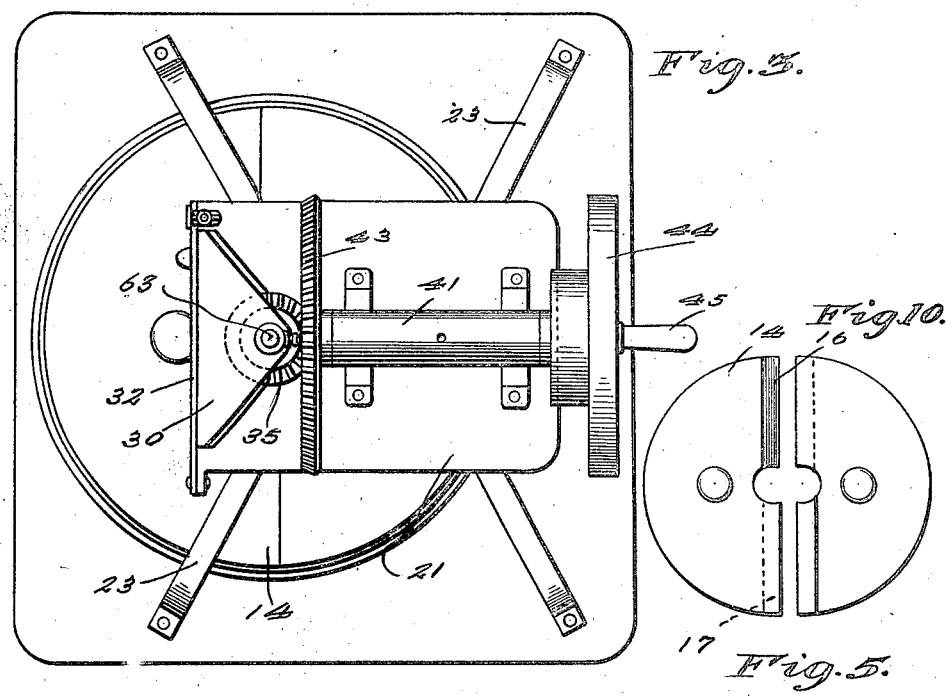
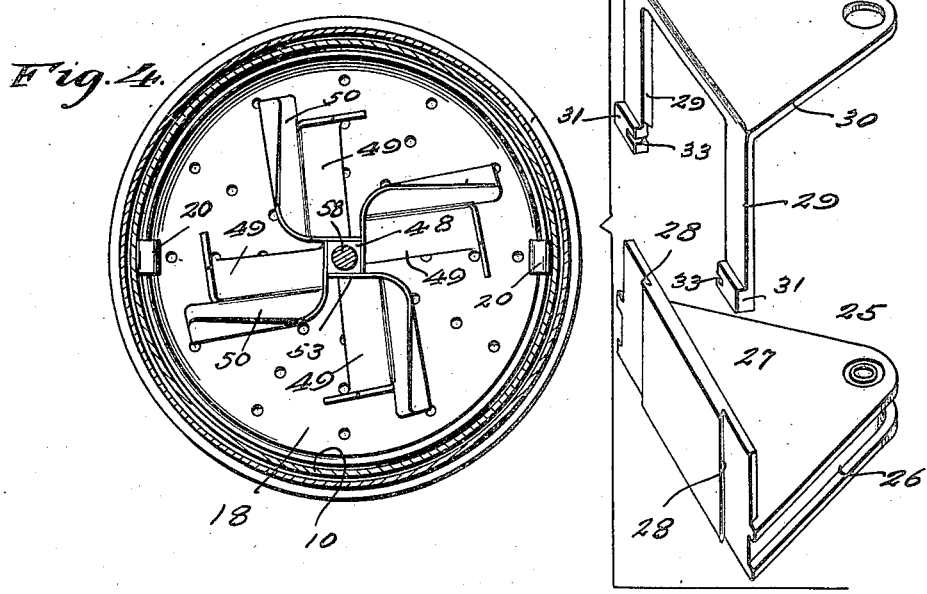
A. E. Hendricks, INVENTOR Patented Aug. 14, 1923.

1,464,873

UNITED STATES PATENT OFFICE.

AVERY E. HENDRICKS, OF MEADOW, TEXAS.

CHURN.

Application filed July 22, 1921. Serial No. 486,310.

*To all whom it may concern:*

Be it known that I, AVERY E. HENDRICKS, citizen of the United States, residing at Meadow, in the county of Terry and State of Texas, have invented new and useful Improvements in Churns, of which the following is a specification.

This invention relates to a churn, and the object is to provide, in connection with a frame, a detachable element mounting a portion of the gearing and permitting of the prompt disconnection of the dasher and its shaft from the frame.

A further object is to provide a box of special construction, detachable from the upper element of the frame, and serving to mount a gear wheel or pinion imparting motion to the vertical shaft and dasher.

A still further object is to provide,—in connection with a cream receptacle of suitable material, such as glass, earthenware, aluminum or other metal, and having a flat or round bottom,—a butter lifter conforming to the shape of the bottom and including upwardly extending elements for engagement by the fingers in the operation of lifting the butter from the receptacle after the two-part top has been removed.

A still further object is to provide a dasher of particular construction and including blades of peculiar form, each comprising a portion adapted to impart upward movement and then outward movement, throwing the cream into contact with the under or inner side of a disk member which may have a downwardly extending flange on the outer edge thereof.

With the foregoing and other objects in view, the invention consists in the novel construction, combination and arrangement of elements hereinafter described and claimed, it being understood that modifications may be made within the scope of the claims without departing from the spirit of the invention.

Figure 1:
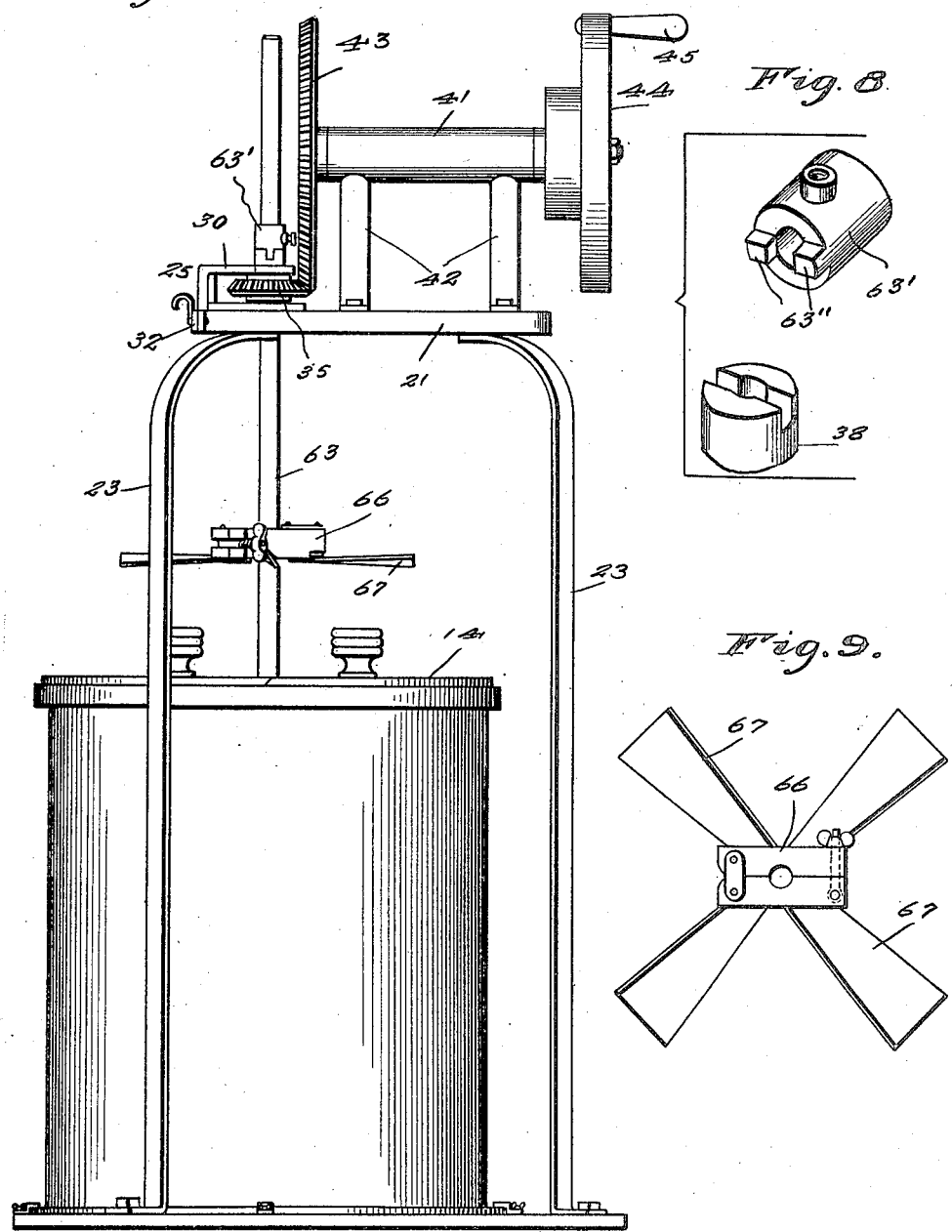
Figure 2:
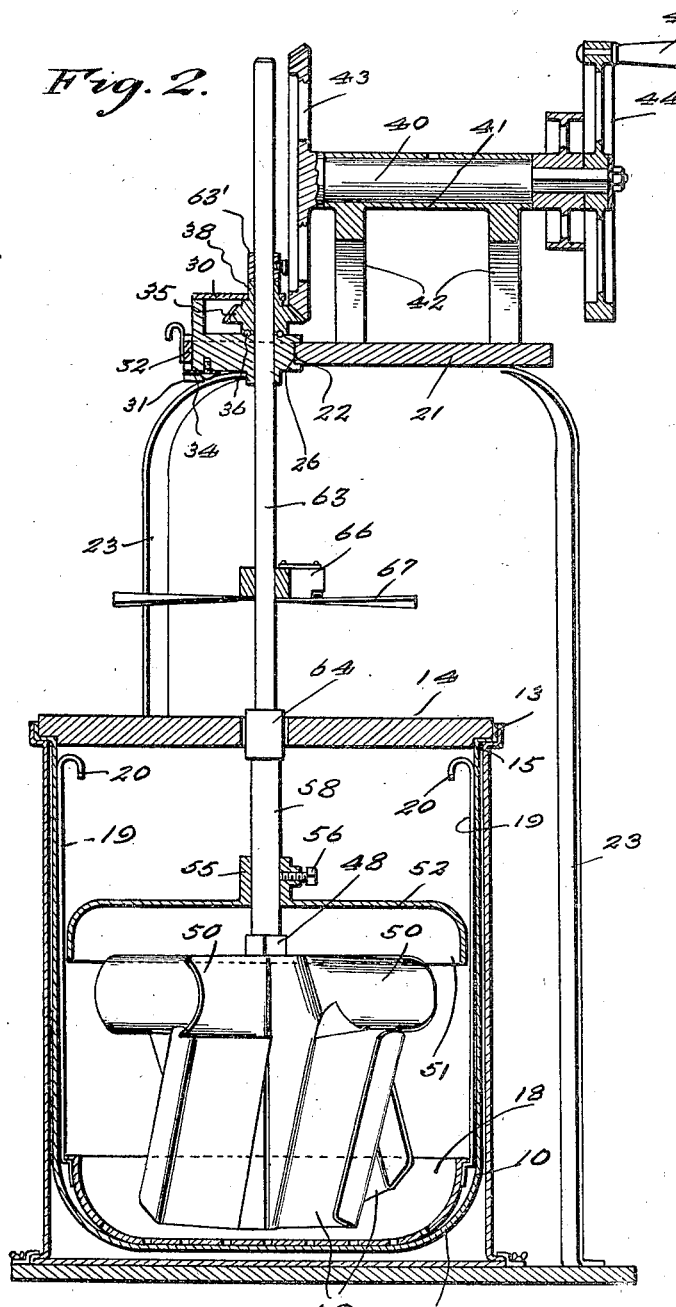
Figure 6:
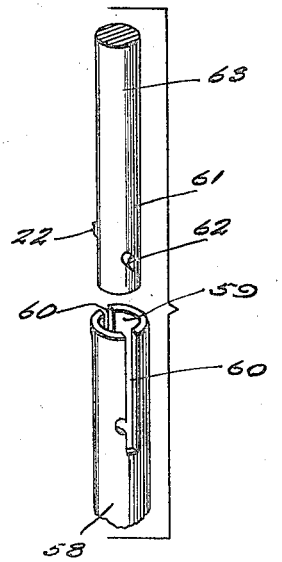
Figure 7:
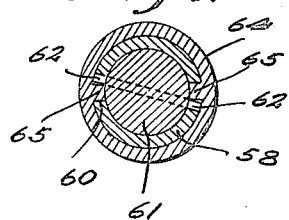

In the drawings, Figure 1 is a view of the churn in side elevation; Figure 2 is a view in vertical section; Figure 3 is a top plan view; Figure 4 is a horizontal section through the cream receptacle, the dasher being in top plan; Figure 5 is a perspective view, showing the elements of the gear frame, detached; Figures 6 to 10 show details of construction, described below.

In carrying out my invention, I provide a receptacle, such as a jar or can 10, which may have a lower partly round bottom 12, and which is provided with an outwardly extending flange 13 at the upper edge thereof.

The two-part cover 14 is cut away to form an annular portion 15 cooperating with the flange, and the elements of the cover are beveled in the manner shown, one beveled portion 16 of each element being inclined in a direction opposite to the portion 17 of that element. The two parts of the cover therefore interlock in the manner illustrated. The butter lifter includes the lower rounded perforated portion 18 and the arms 19 formed with inwardly turned portions 20 for engagement by the fingers in lifting the butter from the receptacle.

The frame includes upper horizontal portion 21 having a V-shaped recess 22 in one side, and further includes the standards 23 for supporting the element 21 at the proper height above the cream receptacle 10.

A box for housing the gear wheel mounted on the vertical shaft carrying the dasher, includes casting 25 having a grooved portion 26 conforming to the V-shaped recess 22. Casting 25 also has a vertical wall 27 provided with undercut portions 28 engaged by the beveled elements 29 projecting downwardly from plate 30. Lugs 31 on elements 29 extend outwardly and are engaged by a pivoted bar 32 serving to hold the box in position with reference to frame element 21. Lugs 31 are slotted at 33 and pivoted locking bar 34 engages these slots and holds plate 30 and casting 25 together.

A gear wheel 35 is mounted between elements 25 and 30 and the vertical shaft carrying the dasher is driven by this gear wheel. Ball bearings 36 may be provided for the gear wheel, and the parts are readily assembled or taken apart in view of the special construction described. Casting 25 is apertured for the vertical shaft and plate 30 is apertured for hub 38 of wheel 35.

On plate 21 I mount a transverse shaft 40 in a tubular element or sleeve 41, with suitable provision for oiling, the sleeve being supported or mounted on brackets 42, or formed integrally therewith. Shaft 40 carries a gear wheel 43 meshing with gear wheel 35, and the opposite end of the shaft carries suitable means for imparting motion to the shaft, such as wheel 44 and crank 45. A driving pulley for a power operated churn would of course be within the scope of the invention.

The dasher includes a central element 48 and blades each having a vertical trough-like portion 49 communicating with an upper transverse scoop-like portion 50, which serves to impart an outward movement to the cream, throwing it into contact with the sides of the receptacle by centrifugal force, or against the flange 51 of the disk 52, if a flanged disk is employed. Particular emphasis is placed on the construction of the blades, and it will be noted that they are formed in one piece and include an inner vertical flange 53 secured to or formed with central element 48. The channel portions 49 are deeper toward their upper ends than at their lower ends—along the line of the inner flanges 53.

Disk 52 may be formed with a boss 55 receiving a set screw 56, by means of which it is secured to the shaft 58. This shaft is connected with the central element 48 of the dasher per se, and has an upper central bore 59 and longitudinal bayonet slots 60, receiving the end 61 and engaging devices 62 of the upper shaft member 63 by means of which the dasher is rotated.

Collar 63', retained on shaft 63 by a set screw, has ribs 63'' engaging slots in the hub of wheel 35, and shaft 63 is driven by gear wheel 35. The sleeve 64 serves an obvious purpose at the point shown, but is also provided with internal ribs 65 entering the slots 60 and holding the parts in locked relation, with the engaging devices 62 in the offset portions of the slots.

The two-part clamping element 66 includes a body carrying blades 67, this element 66 being mounted on upper shaft 63, above the top of receptacle 10, and acting as a fan for keeping away flies and other insects.

Among the important features, as already intimated, is the dasher constructed as specified, and the box, detachable in the manner indicated, from the frame, and permitting the frame to be moved away from the receptacle or can, after the completion of the churning operation. The removal of the box, shaft, and dasher in this manner obviates the necessity for moving the receptacle in order to lift out the butter after churning.

What I claim is—

1. A churn dasher, including blades, each formed with an approximately vertical channel member the major portion of which presents a flat surface, and a laterally extending element having a concave surface, against which cream from the flat surface is thrown, incident to the rotation of the dasher.

2. In a churn, a dasher including blades each formed with an approximately vertical channel member and a laterally extending scoop-shaped member communicating with the channel member.

3. In a churn, a dasher including blades each formed with an approximately vertical trough member, and a laterally extending scoop-shaped member, for deflecting the cream upwardly and outwardly, and a disk mounted above the blades.

4. In a churn, a dasher including blades each formed with an approximately vertical trough member and a laterally extending scoop-shaped member communicating with the trough member, and a disk including a downwardly extending flange, the disk being mounted above the blades, the flange deflecting the material discharged from the blades.

In testimony whereof I affix my signature.

AVERY E. HENDRICKS.